United States Patent
Rose et al.

(10) Patent No.: US 7,665,555 B2
(45) Date of Patent: Feb. 23, 2010

(54) COAST CONTROL SYSTEM FOR AN INDUSTRIAL VEHICLE

(75) Inventors: Timothy L. Rose, Winterville, NC (US); Matthew K. Hoffman, Greenville, NC (US)

(73) Assignee: NMHG Oregon, LLC, Portland, OR (US)

( * ) Notice: Subject to any disclaimer, the term of this patent is extended or adjusted under 35 U.S.C. 154(b) by 378 days.

(21) Appl. No.: 11/556,046

(22) Filed: Nov. 2, 2006

(65) Prior Publication Data

US 2007/0137904 A1 Jun. 21, 2007

Related U.S. Application Data

(63) Continuation-in-part of application No. 11/372,638, filed on Mar. 10, 2006, and a continuation-in-part of application No. 11/110,095, filed on Apr. 19, 2005.

(51) Int. Cl.
*B62D 51/04* (2006.01)
(52) U.S. Cl. ............... 180/19.2; 180/332; 180/334; 180/19.1
(58) Field of Classification Search ............... 180/19.3, 180/19.2, 19.1, 332, 334
See application file for complete search history.

(56) References Cited

U.S. PATENT DOCUMENTS

| 3,946,825 | A | | 3/1976 | Gail |
| 4,392,670 | A | * | 7/1983 | Schultz ................. 280/775 |
| 4,716,980 | A | * | 1/1988 | Butler ................. 180/19.2 |
| 4,950,126 | A | * | 8/1990 | Fabiano et al. ........... 414/590 |
| 5,293,952 | A | | 3/1994 | Ledamoisel et al. |
| 5,657,524 | A | | 8/1997 | Kubala |
| 5,964,313 | A | * | 10/1999 | Guy ................... 180/332 |
| 6,070,691 | A | | 6/2000 | Evans |
| 6,912,831 | B2 | * | 7/2005 | Velke et al. ............ 56/10.9 |
| 7,017,689 | B2 | * | 3/2006 | Gilliland et al. ........ 180/19.1 |
| 7,040,427 | B2 | * | 5/2006 | Toomey ............... 180/19.2 |
| 2003/0029648 | A1 | * | 2/2003 | Trego et al. ........... 180/19.1 |

\* cited by examiner

*Primary Examiner*—Lesley Morris
*Assistant Examiner*—Tashiana Adams
(74) *Attorney, Agent, or Firm*—Stolowitz Ford Cowger LLP

(57) ABSTRACT

An apparatus, system and method to control the operability of a motorized vehicle such as an industrial pallet truck. The apparatus includes a coast control system, a steer arm, and an actuation cylinder attached to the steer arm that maintains the steer arm in an operator selectable position where the coast control system is activated.

28 Claims, 12 Drawing Sheets

Traction Motor Performance

COAST CONTROL SYSTEM FOR AN INDUSTRIAL VEHICLE

This application claims priority and is a Continuation In Part (CIP) of U.S. patent application Ser. No. 11/110,095 filed on Apr. 19, 2005 as well as U.S. patent application Ser. No. 11/372,638 filed on Mar. 10, 2006, both of which are assigned to NMHG Oregon, LLC.

BACKGROUND

An industrial pallet truck is utilized to lift and transport loads between locations. The operator of the pallet truck may be required to move loads repeatedly on and off of the pallet truck within a very short period of time, and is often required to move specific inventory from various locations in what is termed "picking." During this practice, it is desirable that the operator can leave the pallet truck and pick a load while the pallet truck continues to move in the direction of the next load. To avoid inadvertent vehicle travel, pallet trucks have a dead-man mechanism that engage a vehicle brake in the event that the operator leaves the pallet truck and releases the control arm. It is not always practical for the operator to continue to hold the control arm in a non-braking position when leaving the pallet truck and moving to the next pick location. The coast control system is able to retard, or override, the deadman brake mechanism, allowing the pallet truck to coast. The coast control system typically holds the control arm in a fixed or variable position between vertical and horizontal, such that the vehicle brake does not become engaged, and the pallet truck is allowed to coast to a stop in a controlled manner.

A problem associated with certain designs known in the art includes mechanisms which are subject to accelerated breakdown and wear due to environmental conditions. Some designs provide for exposed mechanisms which after a period of time may not function correctly in certain environments. These environments may include locations having low temperatures, high humidity or where the air contains high particulate counts. Other designs include complex or hard to access mechanisms which may be difficult to replace or repair. Still other designs known in the art include steering arms that are locked in a fixed vertical position, for example by a steering arm brake. Locking the steering arm has the undesirable result of impeding a movement of the steering arm towards a vehicle braking position, for example towards a horizontal steering arm position when the operator is attempting to brake the vehicle.

The present invention addresses these and other problems associated with the prior art.

SUMMARY OF THE INVENTION

An apparatus, system and method to control the operability of a motorized vehicle such as an industrial pallet truck. The apparatus includes a steer arm, a deadman mechanism to apply a brake when an operator releases the steer arm, and a coast control system, including an actuation cylinder attached to the steer arm that maintains the steer arm in an operator selectable position when the coast control system is activated.

The foregoing and other objects, features and advantages of the invention will become more readily apparent from the following detailed description of a preferred embodiment of the invention which proceeds with reference to the accompanying drawings.

DETAILED DESCRIPTION

Figure 1:
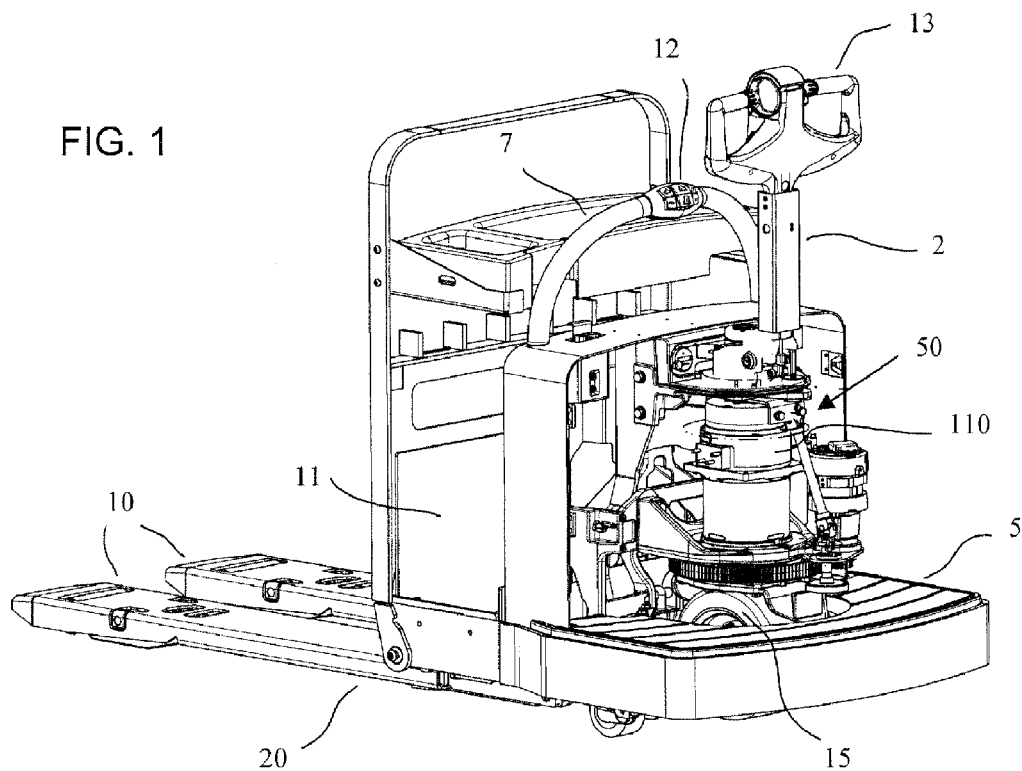
FIG. 1 is a perspective view of a pallet truck in which a novel control system may be made operable.

Industrial vehicle control systems including coast control systems are described in U.S. patent application Ser. No. 11/110,095. FIG. 1 shows a typical pallet truck 20 which may be used with a novel control system. The pallet truck 20 includes an operator platform 5, by which the operator (not shown) may stand on the pallet truck 20. From the operator platform 5, the operator is able to reach the support bar 7 and steer control handle 13. The support bar 7 has at its center point a control panel 12, which is shown in more detail in FIG. 3A. The pallet truck 20 is powered by a traction motor 110 which is energized by a battery 111 (FIG. 7) located in the battery compartment 11.

Figure 2:
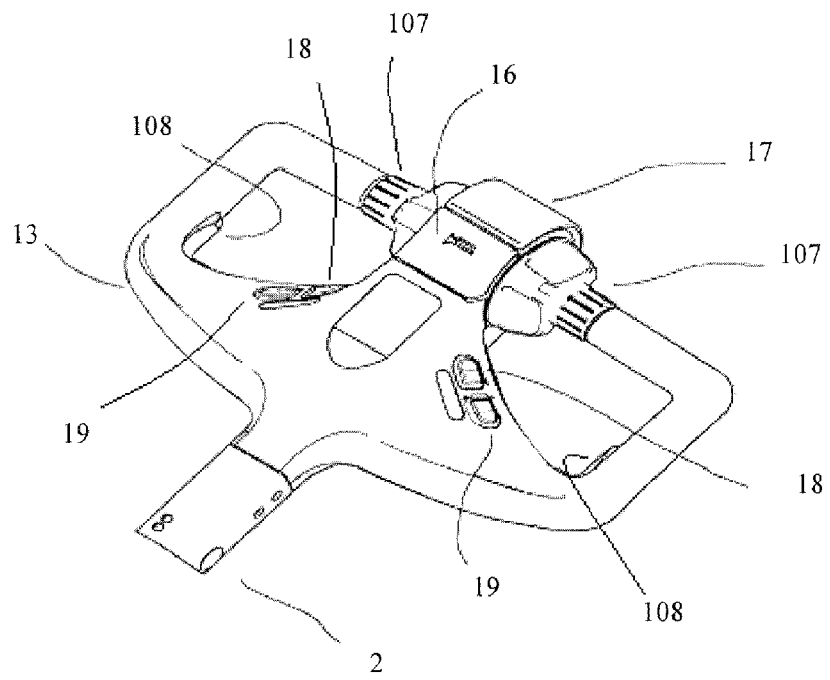
FIG. 2 is a perspective view of a steer control handle.

The steer control handle 13, which is shown in greater detail in FIG. 2 includes a horn button 16, an emergency reverse button 17, two lift buttons 18, and two lower buttons 19. The lift buttons 18 and lower buttons 19 lift and lower, respectively, the forks 10 upon which a load is placed. Two sets of lift buttons 18 and lower buttons 19 are provided to facilitate operation by either a left or right handed operator. The emergency reverse button 17 reverses the direction of the traction motor 110. The steer control handle 13 is attached by means of a steer control arm 2 which controls the direction of a drive wheel 15, which is located directly under the traction motor 110, and controls the direction of travel of the pallet truck 20.

Figure 7:
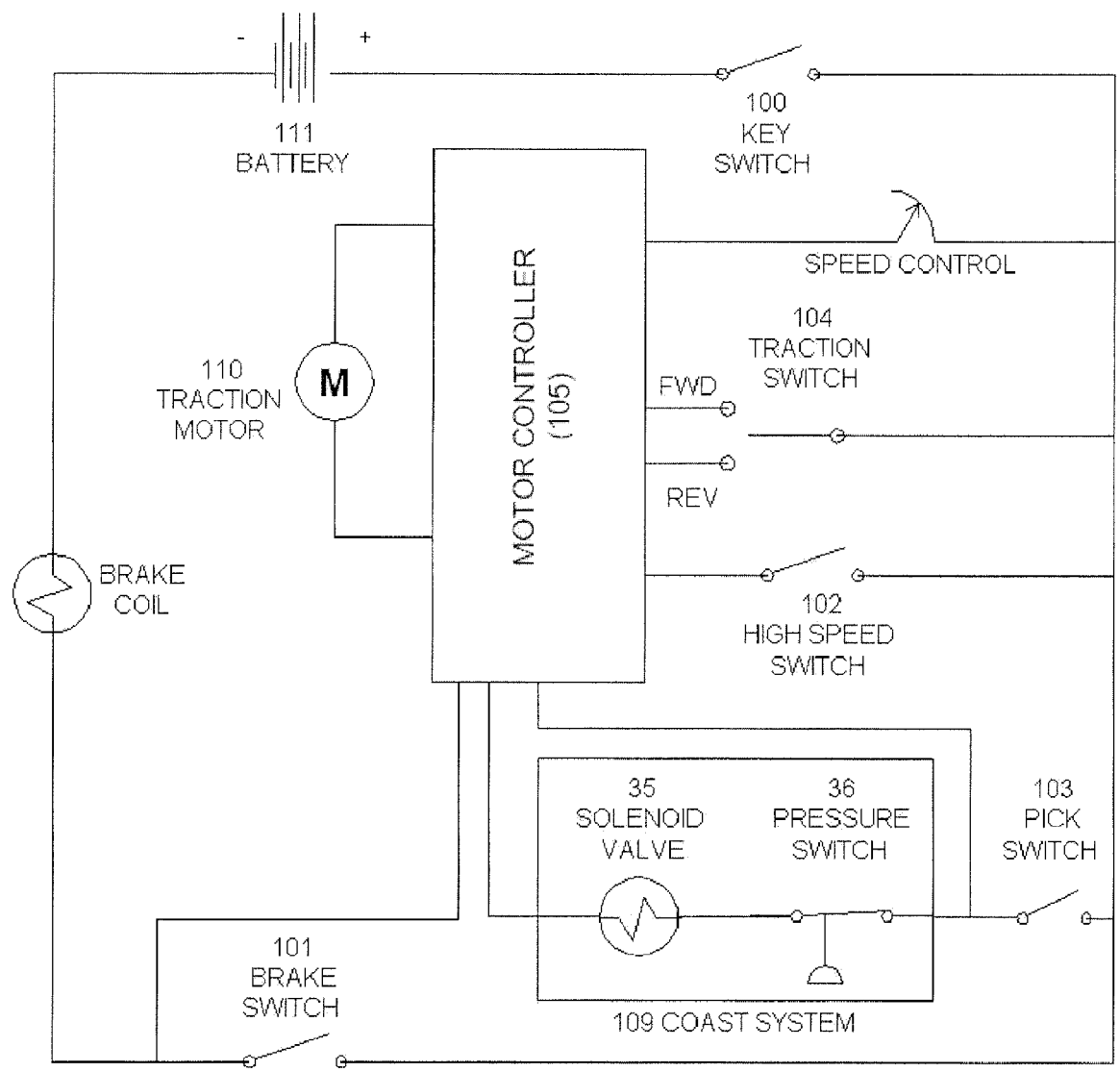
FIG. 7 is a schematic diagram representing the coast control system.

Pick buttons 108 are provided on either side of the steer control handle 13, which may be used to activate a pick state of a coast control system 109 (FIG. 7). The pick button 108 may be pressed, closing pick switch 103 (FIG. 7), to actuate the traction motor 110 within a low speed travel mode, while the pallet truck 20 remains in the pick state. In one embodiment, the coast control system 109 and the traction motor 110 are both engaged at the first instance of pressing one of the pick buttons. The pallet truck 20 may operate in a low speed travel mode until the operator activates a high speed travel mode, or a vehicle brake is engaged. In one embodiment, the pick button 108 is disabled in the high speed travel mode, such that the pallet truck 20 may only be operated in the pick state while the pallet truck 20 is in the low speed travel mode.

The steer control handle 13 has two symmetrically located pick buttons 108 and two symmetrically located variable throttles 107. When the operator is on the operator platform 5 or is walking alongside of the pallet truck 20, the operator may activate one of the pick buttons 108 or throttles 107 with the same hand that is holding and controlling the steer control handle 13. The pallet truck 20 is accelerated by means of a traction motor 110 that may be operated in either the low speed travel mode or the high speed travel mode. In either low speed or high speed travel modes, the traction motor 110 may be actuated by means of one of the throttles 107. The rate of acceleration and maximum travel speeds attainable in the low and high speed travel modes are determined according to the current limiting characteristics of the low and high speed travel circuits, respectively. In one embodiment, the low speed travel mode provides for a maximum travel speed of approximately 3.5 miles per hour. Activation of the throttle 107 causes the traction motor 110 to move in the forward or reverse direction in the low speed travel mode depending on the command sent by the throttle 107 to the traction motor 110.

In the pallet truck 20 shown in FIG. 1 and FIG. 2, the throttle 107 is a butterfly type design which may be rotated away from the operator, to cause the pallet truck 20 to move in the reverse direction, or may be rotated towards the operator, to cause the pallet truck 20 to move in the forward direction, similar to a conventional motorcycle throttle. Other types of throttle 107 may be used, such as twist grips, buttons, toggles, and pedals, without affecting functionality. Similarly, different positions or more instances of the pick button 108 are contemplated and claimed herein.

Figure 3A:
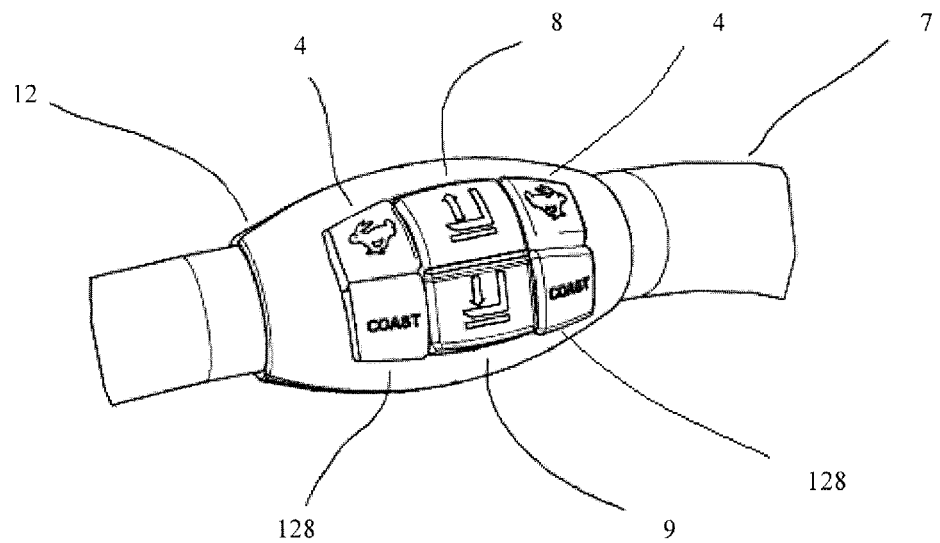
FIG. 3A is a perspective view of a control panel.

With the throttle 107 positioned in the forward or reverse direction, the operator may simultaneously or sequentially press either of the two symmetrically located high speed buttons 4, located on the control panel 12 (FIG. 3A). The operator may then continue to activate the throttle 107 in the high speed mode, whereby the pallet truck 20 is able to travel at a higher maximum speed, for example when the operator desires to move a greater distance between picking loads. If the throttle 107 is released or placed in a neutral position, the pallet truck 20 coasts to a stop, or is caused to brake depending on the position of the steer control arm 2. In one embodiment, subsequent activation of the throttle 107 with the control arm 2 in a non-braking position causes the pallet truck 20 to travel in the low speed mode until and unless the high speed button 4 is again activated.

The control panel 12 shown in FIG. 3A may be equipped with two symmetrically located coast buttons 128, a horn button 116, an auxiliary lift button 8 and an auxiliary lower button 9, which function to lift and lower, respectively, the forks 10. Coast buttons 128, auxiliary lift button 8, and auxiliary lower button 9, function the same as pick buttons 108, lift buttons 18, and lower buttons 19, respectively. Where this written description references any of the buttons located on the steer control handle 13, the associated auxiliary button on the control panel 12 is assumed to provide the same functionality and achieve the same result as if it had instead been pressed by the operator.

One embodiment provides for the coast buttons 128 functioning purely to activate the coast control system 109, and not actuate the traction motor 110 on the initial or any subsequent activation of the coast buttons 128. Actuation of the traction motor 110 may be accomplished by activating the pick buttons 108 after the coast control system 109 has first been activated.

Figure 3B:
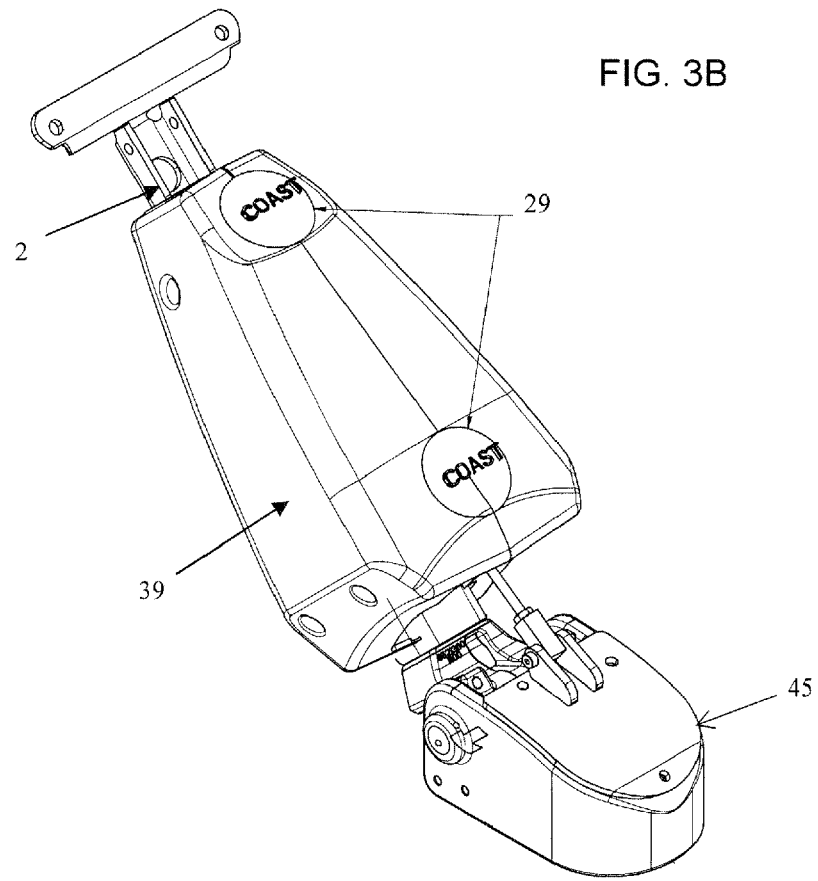
FIG. 3B is a perspective view of a control arm including alternative locations for controls.

FIG. 3B illustrates an alternate embodiment of the control arm 32 including coast buttons 29 located on a control arm cover 39. The control arm 32 is shown mounted to a control arm mounting base 45. Coast buttons 29 may operate the same as coast buttons 128, and may be included in addition to, or in lieu of, coast buttons 128. One or both of the coast buttons 29 may be provided on the control arm cover 39, in different embodiments.

Figure 4A:
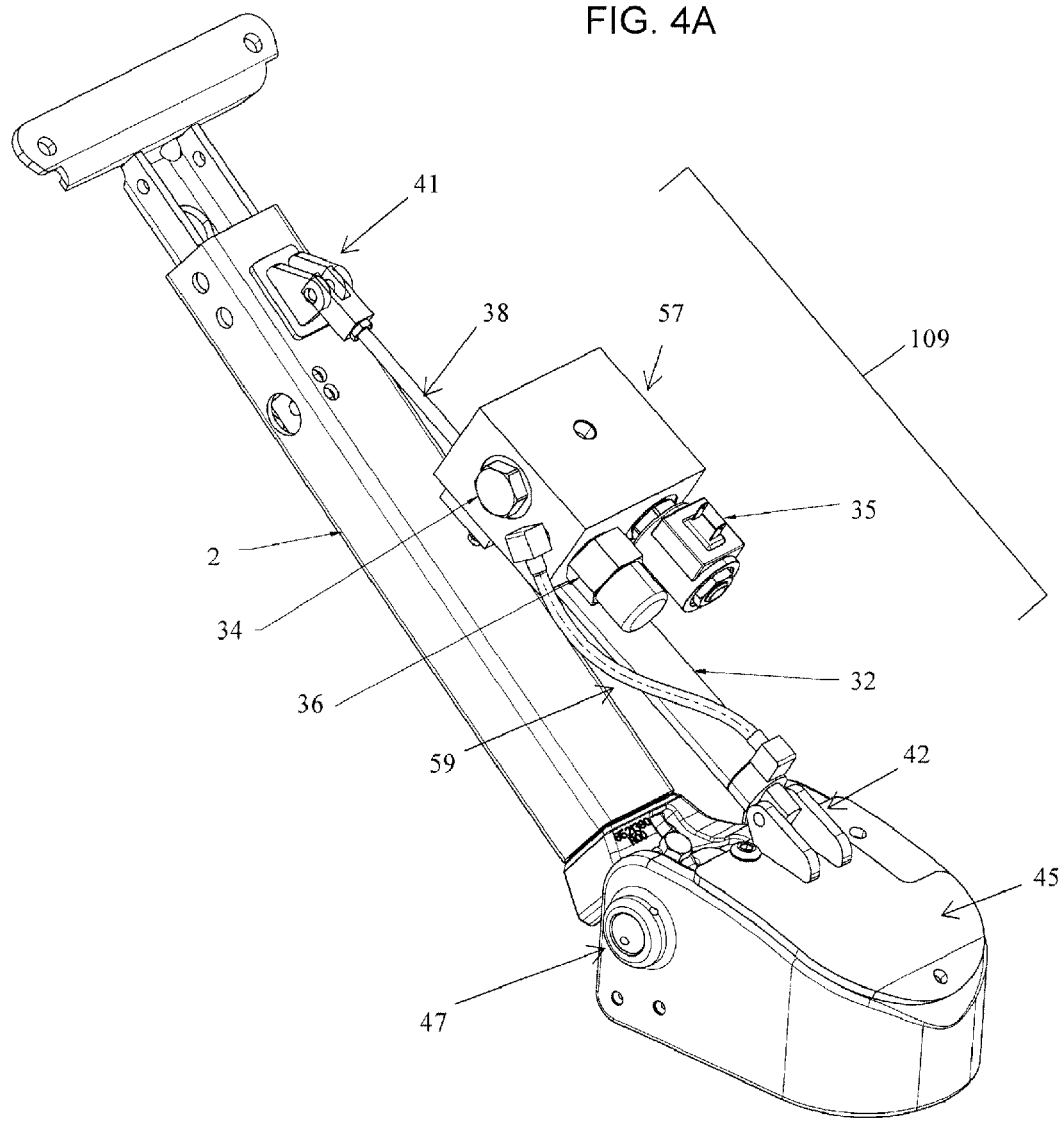
FIG. 4A is a perspective view of a control arm and a coast control system.

The control arm 2 and coast control system 109 are shown in FIG. 4A, as separated from the pallet truck 20 for clarity. The control arm cover 39 of FIG. 3B has been removed to more easily view the internal parts of the coast control system 109. Visible components of the coast control system include a coast control manifold 57, an actuation cylinder 32, a hose 59 connecting manifold 57 with cylinder 32, a control rod 38, a check valve 34, a solenoid valve 35 and a pressure switch 36. A first end 41 of the coast control system 109 is connected to an upper portion of the control arm 2, whereas a second end 42 is connected to a control arm mounting base 45. The control arm 2 is further pivotally attached to the control arm mounting base 45 by pivot shaft 47.

Figure 4B:
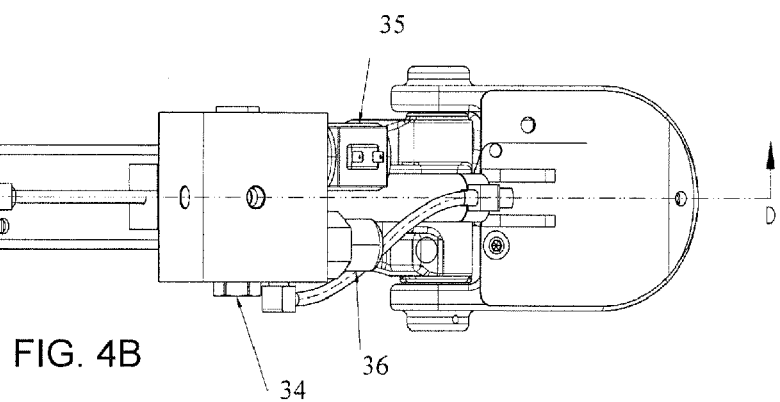
FIG. 4B is a top view of the control arm and coast control system shown in FIG. 4A.
Figure 4C:
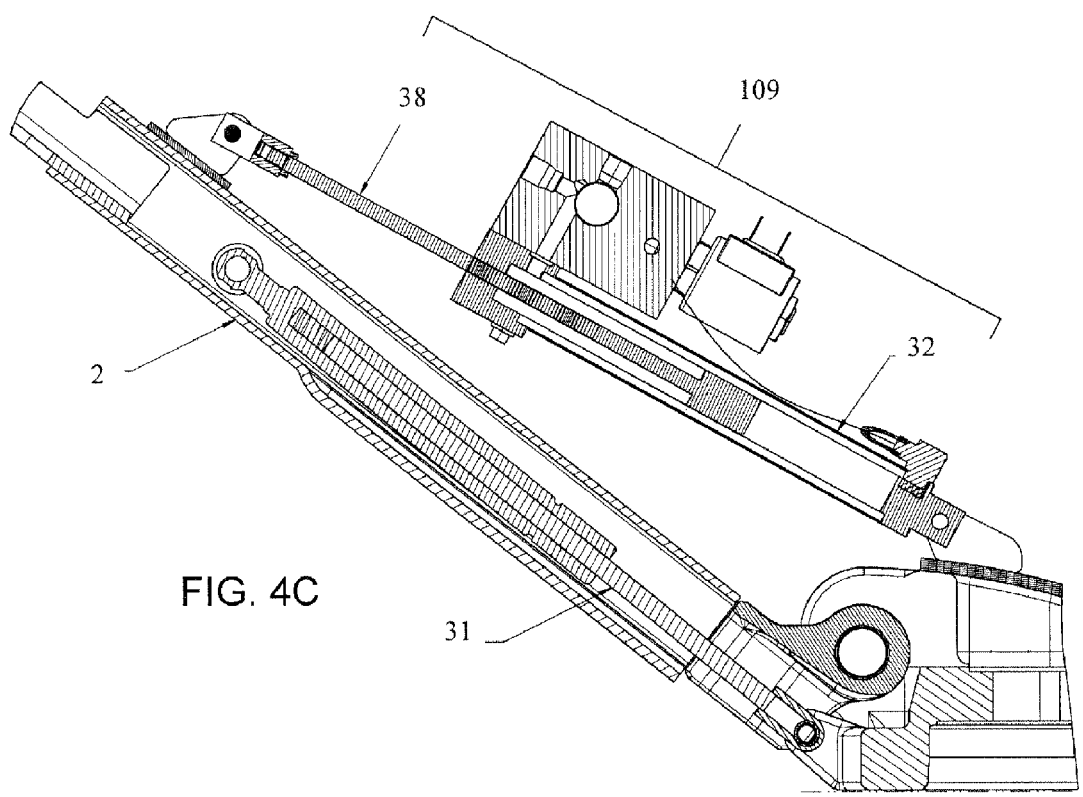
FIG. 4C is a cross sectional view of the control arm and the coast control system identified as section D-D in FIG. 4B.

FIG. 4B provides a top view of the control arm 2 and coast control system 109. A cross-sectional view of the control arm 2 and coast control system 109 is shown in FIG. 4C, and identified as section D-D in FIG. 4B. The control arm 2 includes an internal return spring 31. The return spring 31 acts as a deadman mechanism, such that when the operator releases the control arm 2 from an operating position, the return spring 31 will cause the control arm 2 to move to a vertical position and cause the pallet truck 20 to brake.

Figure 4D:
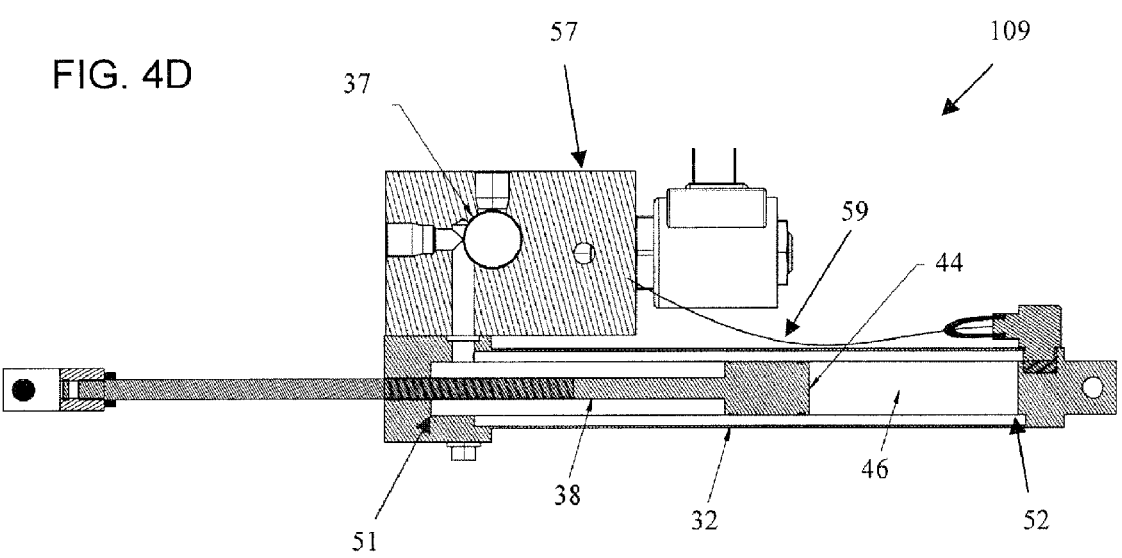
FIG. 4D is an enlarged cross sectional view of the coast control system shown in FIG. 4C.

FIG. 4D provides an enlarged cross-sectional view of the coast control system 109 shown in FIG. 4C. In this view, the control rod 38 and a hydraulic reservoir 37 can be clearly seen. A piston 44 is mounted to the end of the control rod 38 internal to the cylinder 32, such that the piston 44 is slideably seated in a chamber 46 extending from a first end 51 to a second end 52 of the cylinder 32. When the control arm 2 is raised to a vertical position, piston 44 moves to the second end 52 of the cylinder 32, shown on the right side of FIG. 4D, and control rod 38 is located in a retracted position. When the control arm is lowered to a horizontal position, the piston 44 moves to the first end 51 of the cylinder 32, shown on the left side of FIG. 4D, and control rod 38 is located in an extended position.

Figure 4E:
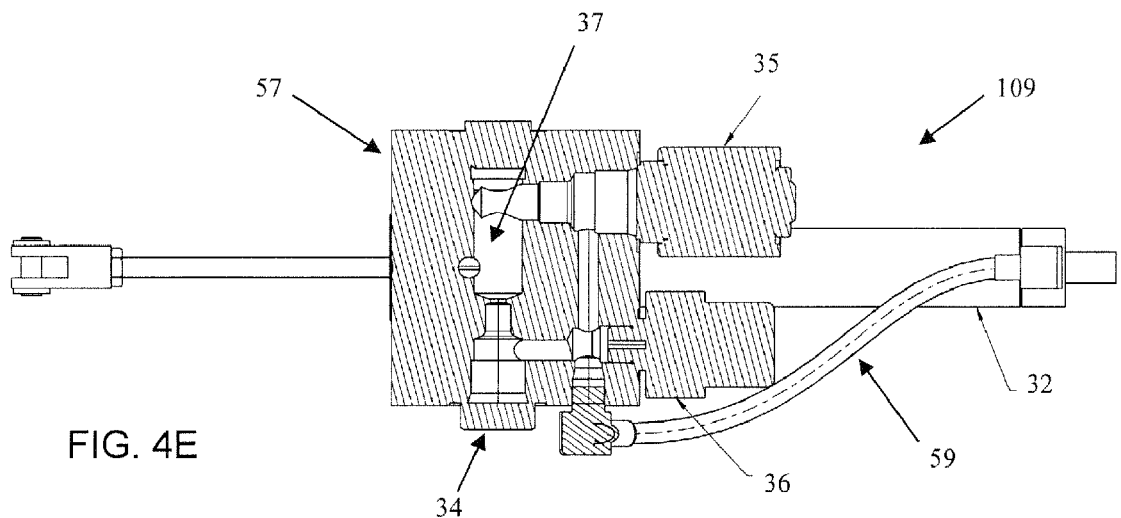
FIG. 4E is a top view of the coast control system providing an internal view of a manifold for clarity.

Both sides of piston 44 in cylinder 32 are continuously filled with hydraulic fluid, as is the internal porting of the coast control system manifold 57 and hose 59. The fluid in reservoir 37 serves to make up the added fluid volume needed when the control arm 2 is lowered to a horizontal position and piston 44 is moved to the first end 51 of the cylinder 32 in FIG. 4D. FIG. 4E is a top view of the coast control system providing a view of the internal components of the manifold 57. The interaction of these components can be better understood by reference to the hydraulic circuit of FIG. 5.

Figure 5:
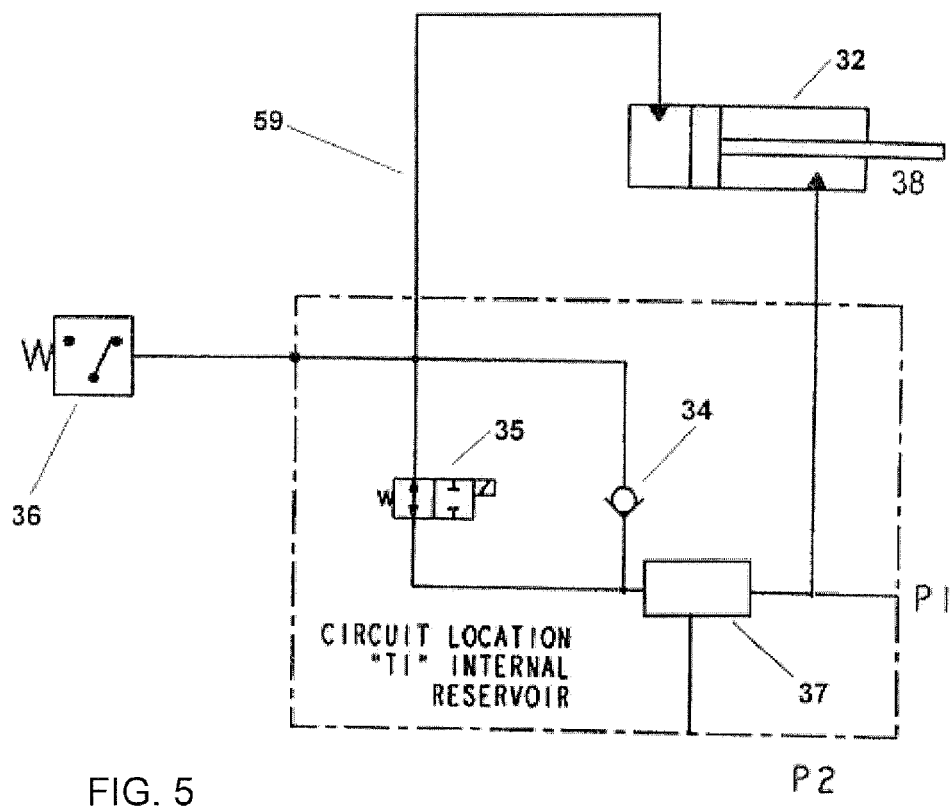
FIG. 5 is a schematic diagram depicting the hydraulic functionality of one embodiment of the coast control system.

Referring further to FIG. 5 the coast control manifold 57 contains valve 35, pressure switch 36 and check valve 34 in addition to reservoir 37. In the state shown, valve 35 allows fluid to pass freely, permitting an unimpeded motion of control rod 38. When valve 35 is energized, the flow of fluid is blocked, preventing movement of the piston 44 towards the second end 52 of the cylinder 32 in FIG. 4D. Check valve 34 is arranged to allow movement of the piston 44 towards the first end 51 of the cylinder 32, whether the valve 35 is energized or not, thereby permitting an unimpeded motion of the control rod 38 to the extended position. In this manner, the control rod 38, and hence the control arm 2, is not locked. Thus, movement of the control arm 2 to the horizontal braking position is unimpeded, regardless of the state of valve 35, while motion to the vertical position will be resisted when valve 35 is in the blocking position. In practice, when the valve 35 is in the blocking position and the control arm is released, return spring 31 will urge the control arm 2 toward the vertical position causing a pressure build up in chamber 46 of cylinder 32. This pressure acting against piston 44 increases to balance the upward force of return spring 31, causing the control arm 2 to remain balanced in the approximate same position.

When valve 35 is in the blocking position and the operator raises the control arm toward the vertical position, the pressure in chamber 46 increases, causing pressure switch 36 to open which then de-energizes valve 35, relieving the pressure in chamber 46. This allows free movement of control arm 2 to the vertical position.

Figure 4F:
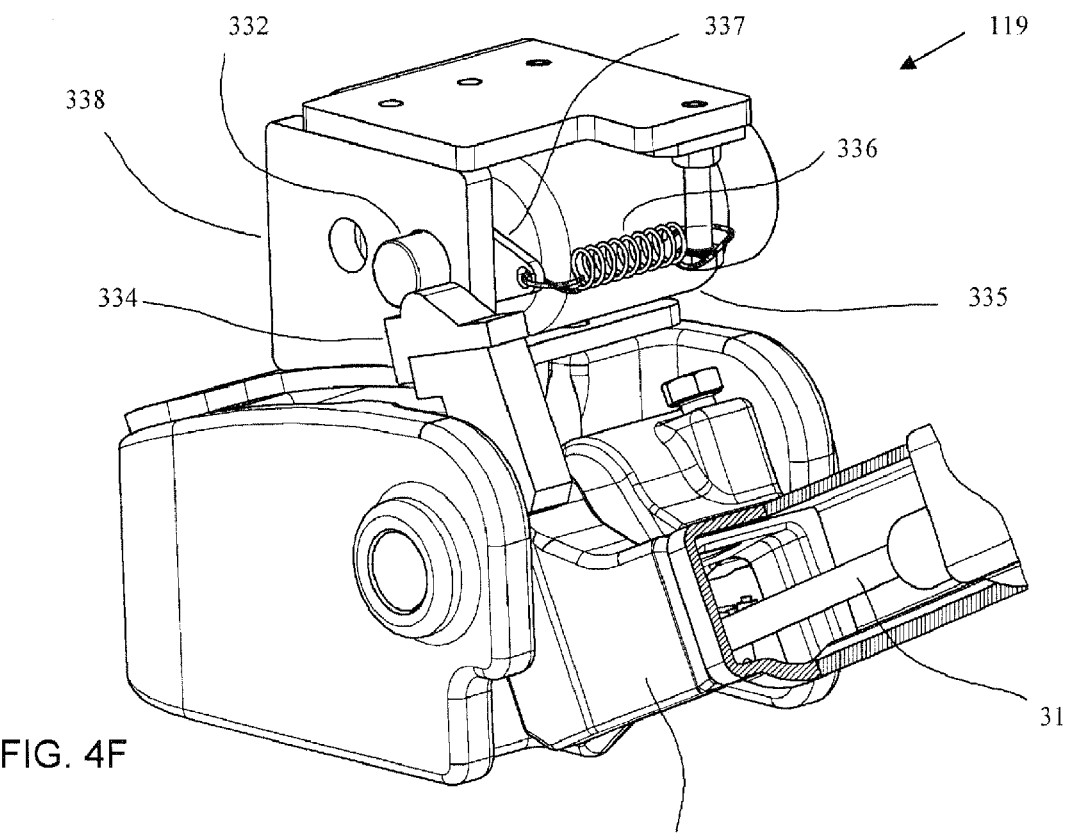
FIG. 4F is a perspective view of an alternate embodiment of a coast control system.

FIG. 4F shows an alternate embodiment of a coast control system 119, which operates similarly as coast control system 109 other than for the mechanical features disclosed below. Coast control system 119 is comprised of a pin 332, a control arm detent 334, an electric push solenoid 335, a solenoid return spring 336, a pin return plate 337, and a solenoid holding weldment 338. Coast control system 119 interacts with a return spring 31. Return spring 31 functions as a dead-man brake mechanism causing control arm 2 to return to a vertical braking position when the operator ceases to hold the control arm 2 in a non vertical position. In this case, the return spring 31 applies a force to move the control arm 2 to a vertical, braking position, which in turn de-activates the vehicle brake switch 101 (FIG. 7). De-activation of the vehicle brake switch 101 causes the vehicle brake to engage. The return spring 31 force may be overcome by the operator holding the steer control handle 13 in a lowered position.

Activation of the pick button 108 causes the solenoid 335 to push the pin 332 through a hole in the solenoid holding weldment 338 and into the path of the control arm detent 334. The interference between the control arm detent 334 and the pin 332 is enough to overcome and balance the force applied by the return spring 31, and instead maintain the control arm 2 in a non-vertical position. The control arm 2 remains in a non-braking position even if the operator releases both the pick button 108 and the steering handle 13, and a moving pallet truck 20 will be allowed to coast to a stop if no further operator intervention occurs.

The operator can overcome the interference between the control arm detent 334 and the pin 332 by applying pressure to the steer control handle 13 in an upward motion, and move the control arm 2 to a braking position, thereby activating the vehicle brake switch 101 in order to apply a braking force to the pallet truck 20. In one embodiment, a force of approximately 15 pounds applied at the steer control handle 13 causes the rubber control arm stop 334 to deform sufficiently for it to pass by the detent 332, and thereby disengage the coast control system 119. The coast control mechanism 119 effectively overrides and balances the force generated by the control arm return spring 331. Because the control arm 2 is not locked, the coast control mechanism 119 does not impede a movement of the control arm 2 towards a horizontal braking position.

When the control arm 2 is moved away from the position maintained by the coast control system 119, the solenoid 335 stops applying a force to the pin 332, and instead the solenoid return spring 336 causes the pin 332 to retract through the solenoid holding weldment 338 and away from the control arm detent 334 by means of the movable pin return plate 337 which is attached directly to the pin 332.

The coast control systems 109 and 119 provide for maintaining the control arm 2 in a position between vertical and horizontal, however other coast control systems can be employed, such as a magnetic or friction device, which would hold the control arm 2 in any one of an infinite number of positions between vertical and horizontal.

Figure 6:
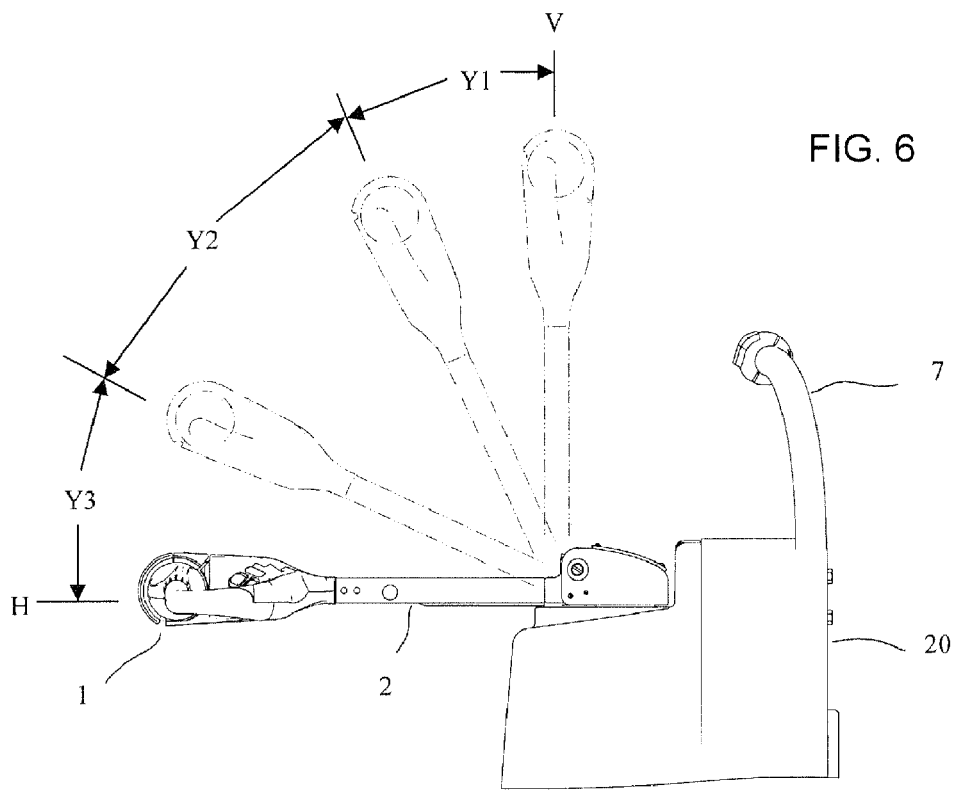
FIG. 6 is a side view of the control arm mounted to a pallet truck shown in partial view, depicting multiple ranges of motion.
Figure 11:
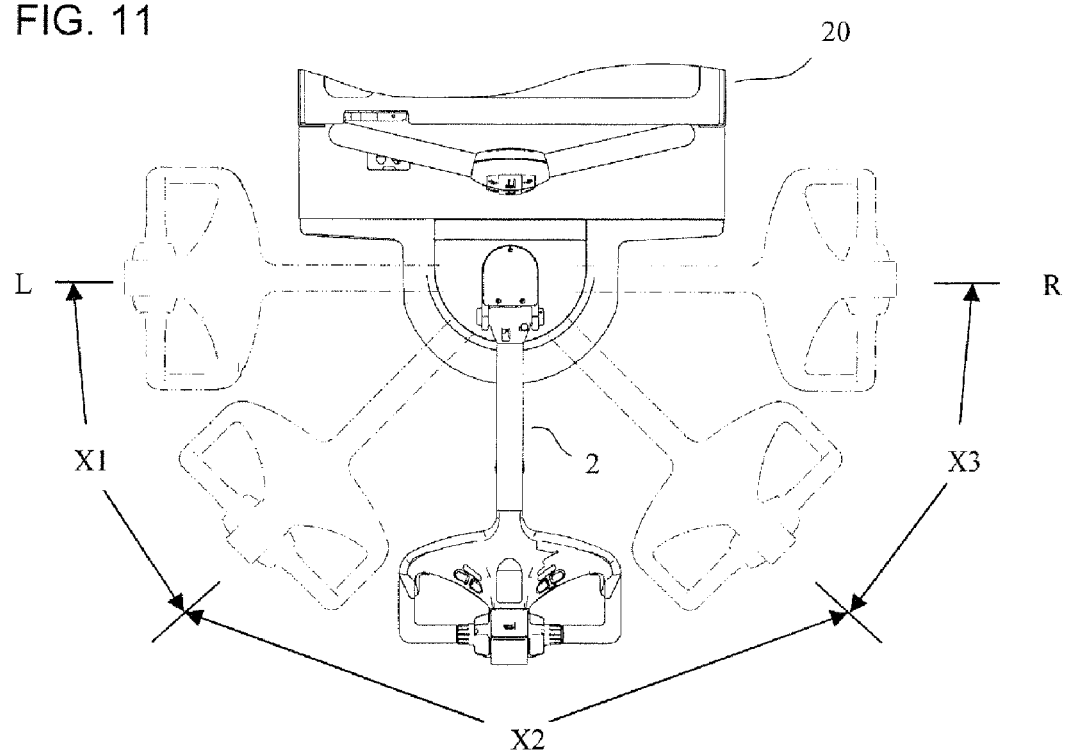
FIG. 11 is a top view of the control arm, depicting multiple ranges of horizontal motion.

The control arm 2 can be pivoted about a vertical axis as well as a horizontal axis as shown in FIG. 6 and FIG. 11, or may be pivoted about both axes simultaneously providing for a virtually infinite number of positions in an approximate quarter-sphere operating range. FIG. 6 shows five distinct ranges of vertical movement of the control arm 2, defined as V, Y1, Y2, Y3, and H, which determines the acceleration, deceleration, braking, and travel speed, for the pallet truck 20 for a given horizontal position of the control arm 2. The pallet truck 20 is caused to brake when the control arm 2 is in an approximate vertical position V and approximate horizontal position H. The term approximate as used in the preceding sentence, could be understood to provide a range of 3 to 10 degrees from the vertical or horizontal position, for example.

When the coast control system 109 or 119 is activated, a position of the control arm 2 may be maintained intermediate the pivot ranges Y1 and Y3 shown in FIG. 6. As a result, the control arm 2 remains in a non-braking position if the operator releases both the pick button 108 and the steering handle 13, and the moving pallet truck 20 is allowed to coast to a stop if no further operator intervention occurs. The operator can overcome the force applied by the actuation cylinder 32 or pin 332 by applying pressure to the steer control handle 13 in an upward motion in order to move the control arm 2 to a braking position. With the control arm 2 in a braking position this de-activates a vehicle brake switch 101 (FIG. 7) which then causes a braking force to be applied to the pallet truck 20. Because the control arm 2 is not locked, the coast control systems 109 or 119 including actuation cylinder 32 or pin 332 respectively do not impede a motion of the steer control handle 13 in a downward motion. The operator is therefore able to move the control arm 2 to a horizontal braking position without having to overcome the force being provided by the actuation cylinder 32 or pin 332.

FIG. 7 provides an illustrative circuit of one embodiment. This circuit provides for various modes of travel, including low speed travel mode, high speed travel mode, coast control, and the pick state or walking state. With the pallet truck 20 in a powered-down state, all switches shown in FIG. 7, including 100, 101, 102, 103 and 104, are open, and the return spring 31 maintains the control arm 2 in a vertical position and de-activates the vehicle brake switch 101. When the pallet truck 20 is powered on, key switch 100 is closed, however the circuit is still not energized because the brake switch 101 remains open. To close the brake switch 101, the operator moves the control arm 2 into a non-braking position between vertical and horizontal. Once both switches 100 and 101 are closed, the circuit is energized in a low speed travel mode. In the low speed travel mode, acceleration of the pallet truck 20 via a traction motor 110 may be accomplished by use of the variable throttle 107 which provides a limited predetermined rate of travel for the pallet truck 20 according to the regulation provided by the motor controller 105.

With the pallet truck 20 in a powered-down state, return spring 31 (FIG. 4C) causes the control arm 2 to remain in a vertical position, thereby opening vehicle brake switch 101. The return spring 31 is shown as being connected internally to the control arm 2, however it could be attached externally. The return spring 31 maintains the control arm 2 in the vertical position in the powered-down and powered-up states unless moved to a non-vertical position by the operator. In one embodiment, with the control arm 2 of the pallet truck 20 in a braking position, the low and high speed travel circuits may not be energized and therefore the traction motor 110 may not be actuated, even after the key switch 100 has been turned on and the pallet truck 20 has been powered-on.

With the pallet truck 20 in a powered-on state, and the control arm 2 lowered to a non-braking position, the pallet truck 20 automatically enters the low speed travel mode. In this mode, the operator may operate the pallet truck 20 when riding on, when walking alongside, or walking behind, the pallet truck 20. If the operator releases the control arm 2, the return spring 31 causes the control arm 2 to return to a vertical position and de-activate the vehicle brake switch 101, thereby causing the pallet truck 20 to stop.

The dead-man brake mechanism functions when the operator ceases to hold the control arm 2 in a non vertical position. In this case, the return spring 31 normally applies a force to move the control arm 2 to a vertical, braking position, which in turn de-activates the vehicle brake switch 101. However, the return spring 31 force may be overcome by the operator holding the steer control handle 13 in a lowered position.

An embodiment is now described making reference to FIGS. 4-7. Activation of the pick button 108 causes the pick switch 103 (FIG. 7) to signal a motor controller 105 and thereby engage the coast control system 109. The solenoid valve 35 inhibits the flow of hydraulic fluid through the actuation cylinder 32, thereby building pressure in chamber 46 in response to the upward force of spring 31 and thereby exerting an opposing balancing force to maintain control arm 2 in the user selected position.

An operator applied upward force to the steer control arm 2 for example through control handle 13 that is maintained by the coast control system 109 in a range Y2, will cause the pressure within the actuation cylinder 32 to increase until a predetermined pressure causes the pressure switch 36 to open and de-actuate the solenoid valve 35, releasing the pressure from the actuation cylinder 32 and allowing hydraulic fluid to flow back to the reservoir 37 and the opposite side of piston 44. This releases the coast control system 109 and allows the steer control arm 2 to be moved from range Y2 to the vertical braking position V. The brake switch 101 is de-activated when the steer control arm 2 is positioned approximately vertical. The traction motor 110 may no longer be controlled by the motor controller 105 when the brake switch 101 is de-activated.

An operator applied downward force on the steer control arm 2 that is maintained by the coast control system 109 in a range Y2, such that the control arm 2 movement to a braking position H, is not impeded. Hydraulic oil flows through check valve 34 (FIG. 5) to the opposite side of piston 44 (FIG. 4D). The brake switch 101 is de-activated and the coast control system 109 is released when the steer control arm 2 is positioned approximately horizontal. As previously described, the traction motor 110 may no longer be controlled by the motor controller 105 when the brake switch 101 is de-activated.

The coast control system 109 provides for maintaining the control arm 2 in an operator selected position between vertical and horizontal. In one embodiment, a mechanical, pneumatic or hydraulic force may be applied to the actuation cylinder 32 that would function to maintain the control arm 2 in a user selected position. The pneumatic or hydraulic force could be directed into the actuation cylinder 32 that would oppose and balance an upward force imparted by a deadman mechanism. A mechanical force provided by a mechanical device, such as a gear, deformable stop, or friction device, could also provide the deadman override. Other types of actuating cylinders having rods that are known in the art are claimed herein.

With the pallet truck 20 operating in the low speed travel mode, the operator is able to activate the pick state, or walking state, of the pallet truck 20 by activating a pick button 108. The pick button 108, or other type of switch, may be located anywhere on the truck, including the control arm handle 13, the operator platform 5, or on the support bar 7, for example. With the pick state activated by means of pressing pick button 108, the coast control system 109 or 119 of the pallet truck is activated which causes the control arm 2 to remain in a non-braking position. This prevents the vehicle brake switch 101 from being de-activated, and permits the moving pallet truck 20 to coast to a stop after the traction motor 110 is no longer powered by the motor controller 105.

Activation of the pick button 108 causes the pallet truck 20 to move in the forward direction, forks 10 trailing, up to the maximum allowable travel speed in the low speed travel mode. Activation of the pick button 108 maintains activation of the coast control system 109 that opposes and balances the force of the return spring 31, or deadman mechanism. When the operator releases the pick button 108, the pallet truck 20 coasts to a stop without the operator having to maintain physical contact with the pallet truck 20 or the control arm 2. The operator is able to walk alongside the pallet truck 20 to pick the next load. While the pallet truck 20 is in the pick state, the operator is able to repeatedly accelerate the pallet truck 20 within the low speed travel range by either reactivating the pick button 108, or by rotating the throttle 107.

The pallet truck 20 remains in the pick state until the vehicle brake switch 101 is activated, the high speed travel button 4 is activated, the battery 111 is disconnected, or the key switch 100 is turned off. The battery 111 may become disconnected from the electrical circuit by physical removal of connecting wiring or if the operator presses an emergency off button (not shown) and in either case the pallet truck 20 is no longer operating in the pick state. If the operator moves the control arm 2 into either a vertical or horizontal position, the vehicle brake switch 101 is de-activated, the traction motor 110 is no longer powered by the motor controller 105 as the low and high speed travel circuits are open, and the pallet truck 20 is no longer operating in the pick state.

In one embodiment, activation of the throttle 107, pick button 108, and the high speed button 4 is not effective with the control arm 2 in a braking position. The braking position of the control arm 2 is specified by an approximate vertical position V and approximate horizontal position H as shown in FIG. 6. The term approximate as used in the preceding sentence, could be understood to provide a predetermined angle from the vertical or horizontal position. The throttle 107, pick button 108, and the high speed button 4 may all be normally applied when the control arm is located in range Y2. As the control arm 2 approaches the vertical and horizontal braking positions, and is in the ranges of motion shown as Y1 and Y3, the level of performance of the traction motor 110 may be maintained at a lower value so as to avoid abrupt changes in acceleration of the pallet truck 20. These systems recognize that when the control arm 2 is in a near vertical position that the operator is likely preparing to brake the pallet truck 20, and requires more sensitive control for steering and acceleration at these lower speeds. By causing a reduction in the overall rate of acceleration of the pallet truck 20, the operator is able to control the speed of the pallet truck 20 in finer increments while using the same throttle 107 at normal travel speeds. Another embodiment includes a high speed button 4 that is only functional in the range Y2, or instead that would provide for an intermediate vehicle acceleration rate less than the maximum high speed travel rate and greater than the low speed travel rate.

With the control arm 2 located in a non-braking position, the operator can activate the pick state by pressing the pick button 108. Pressing the pick button 108 closes the pick switch 103, thereby activating the coast control system 109 or 119. This energizes the motor controller 105 and actuates the traction motor 110 in the low speed travel mode as limited to a predetermined rate of travel for the pallet truck 20 according to the low speed travel range. The pick state is de-actuated when the pick button 108 is released and therefore the pick switch 103 is opened. The pallet truck 20 remains in the pick state until one of the following conditions occurs: the vehicle brake switch 101 is de-activated, the high speed switch 102 is activated, the battery 111 is disconnected, or the key switch 100 is turned off.

With the pick switch 103 closed, and the coast control system 109 or 119 activated, the control arm 2 is maintained in an operator selected position between vertical and horizontal by the coast control system 109 or 119 which thereby opposes and balances the force of return spring 31. Therefore, when the operator releases the pick button 108, the traction motor 110 is no longer powered by the motor controller 105, however the coast control system 109 or 119 continues to balance the return spring 31 thus allowing the pallet truck 20 to coast to a stop even when the operator is no longer holding the control arm 2 in a non-braking position. This allows the operator to leave the moving pallet truck 20, and walk alongside the pallet truck 20 in order to pick the next load. This is considered the pick state or walking state of the pallet truck 20 operation. Pick state allows for continuous activation of the coast control system 109 or 119 and actuation of the traction motor 110 in the low speed travel mode, either by pressing the pick button 108 or engaging the throttle 107.

The operator may activate the high speed travel mode by simultaneously or sequentially engaging the throttle 107 and pressing the high speed button 4, which closes the high speed switch 102. After the throttle 107 is engaged, the high speed mode remains engaged until the throttle 107 is placed in neutral, the battery 111 is disconnected, the brake switch 101 is opened, or the key switch 100 is turned off. When the high speed switch 102 is closed, the pick switch 103 is opened and the coast mechanism 109 is deactivated if the pallet truck 20 was in the pick state prior to activation of the high speed travel mode.

Disconnecting the battery 111, opening the key switch 100, or opening the brake switch 101, causes all other switches in the circuit to become open, preventing engagement of the traction motor 110 in any of the travel modes or operating states discussed.

Figure 8:
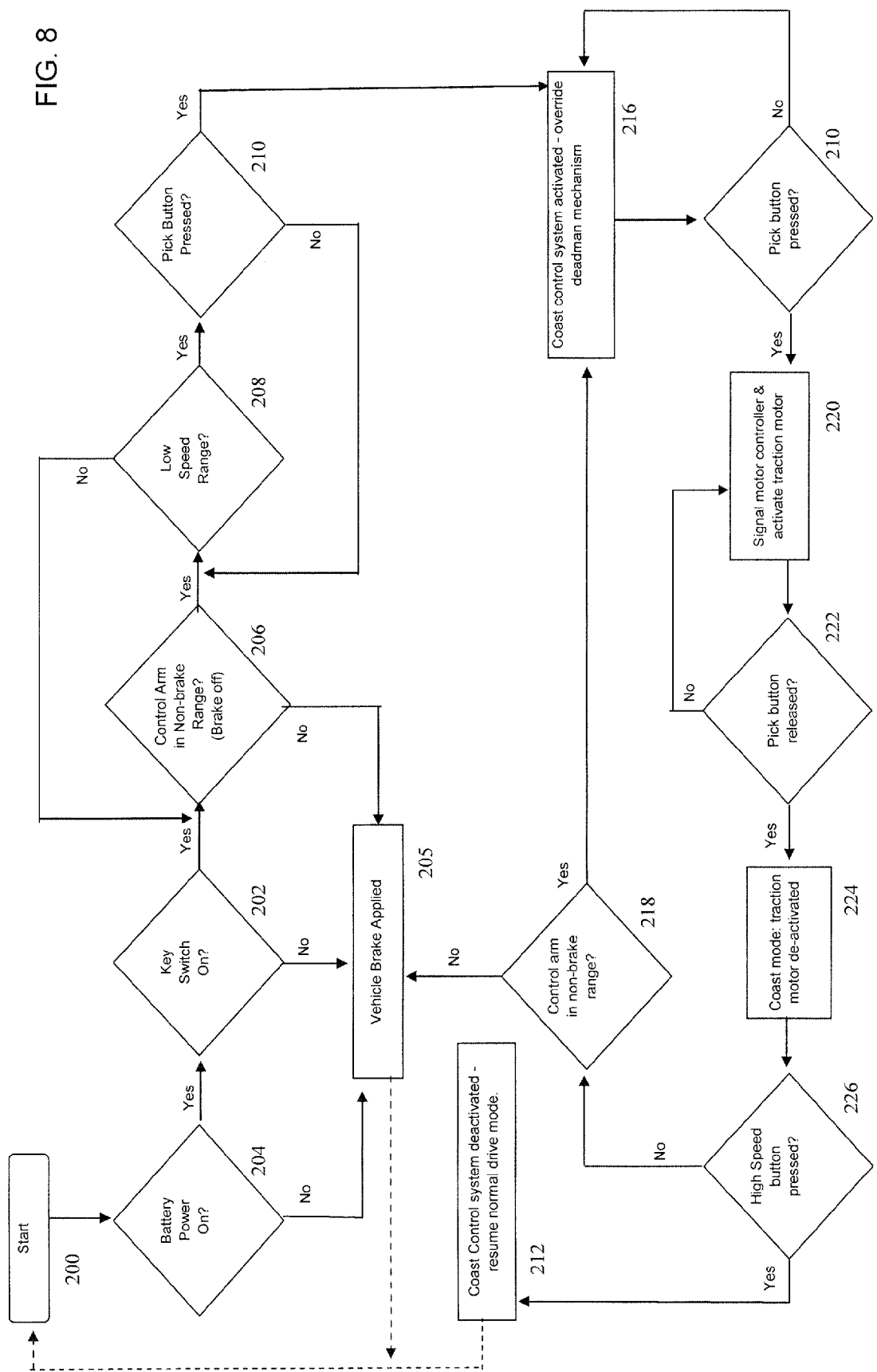
FIG. 8 is a flow diagram showing the logical flow of a coast control mode of the pallet truck.

FIG. 8 shows an embodiment of a flow diagram of the pick state logic of the pallet truck 20, as monitored by the motor controller 105, which may be an on-board processor in one embodiment. The motor controller 105 initially evaluates the state of the electrical and mechanical operating systems. Pressing the pick button 108 has no effect if any of the following prior conditions exist: key switch 100 is turned off (operation 202), battery power is disconnected (operation 204), the control arm 2 is in a braking position (operation 206), or the pallet truck 20 is in a non-low speed travel mode (208). When the pick button 108 is pressed (operation 210), the coast control system 109 or 119 is activated (operation 216) thereby overriding the deadman mechanism, and the traction motor 110 is engaged (operation 220). When the pick button 108 is released (operation 222), the traction motor 110 de-actuates (operation 224), and the motor controller 105 goes into a system check loop until the pick button 108 is again pressed (operation 210), or the control arm is located in a braking range (operation 218). When the control arm is located in a braking range, then the vehicle brake is applied (operation 205). When the high speed button is pushed (operation 226), then the coast control system 109 or 119 deactivates (operation 212) and the truck resumes a normal driving mode.

Variable acceleration, braking and travel speed as defined by the position of the control arm 2 can be defined differently for high speed travel than for low speed travel. In another embodiment, high speed travel would only be possible with the control arm 2 in a center steering range between left and right, and the center range between vertical and horizontal braking conditions. In another embodiment, acceleration and travel speeds would be made to vary similar to the low speed travel modes when the control arm 2 lies in a range adjacent to the vertical or horizontal positions. Because of the inherent instability with the control arm 2 located in the extreme left and right steer positions, it may be desirable that the high speed button 4 is not functional in this condition, and that the pallet truck 20 would instead operate only under the conditions of the low speed travel mode.

Figure 9:
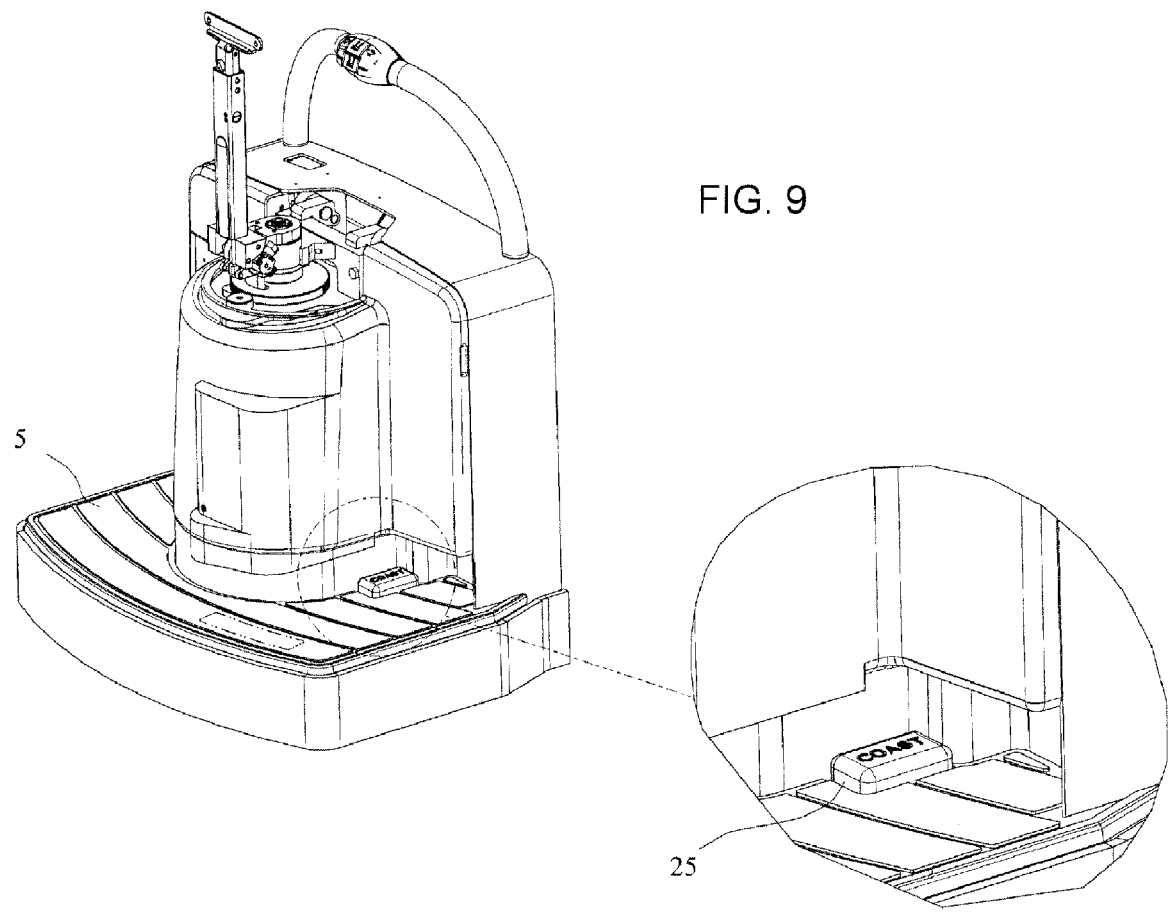
FIG. 9 is a perspective view of an alternate embodiment of a coast control system, with a coast control button located on the operator platform.

In another embodiment, a coast control enable button 25 shown in FIG. 9 is mounted to the operator platform 5. The operator first enables the coast control system by depressing the coast control enable button 25, and is then able to accelerate the pallet truck 20 in the pick state by means of the throttle 107 or pick button 108. In one embodiment, the coast control enable button 25 activates the coast control system 109 or 119 but does not actuate the traction motor when it is initially pressed. Pressing the coast control enable button 25 a second time could be set to deactivate the coast control system 109 or 119.

Figure 10:
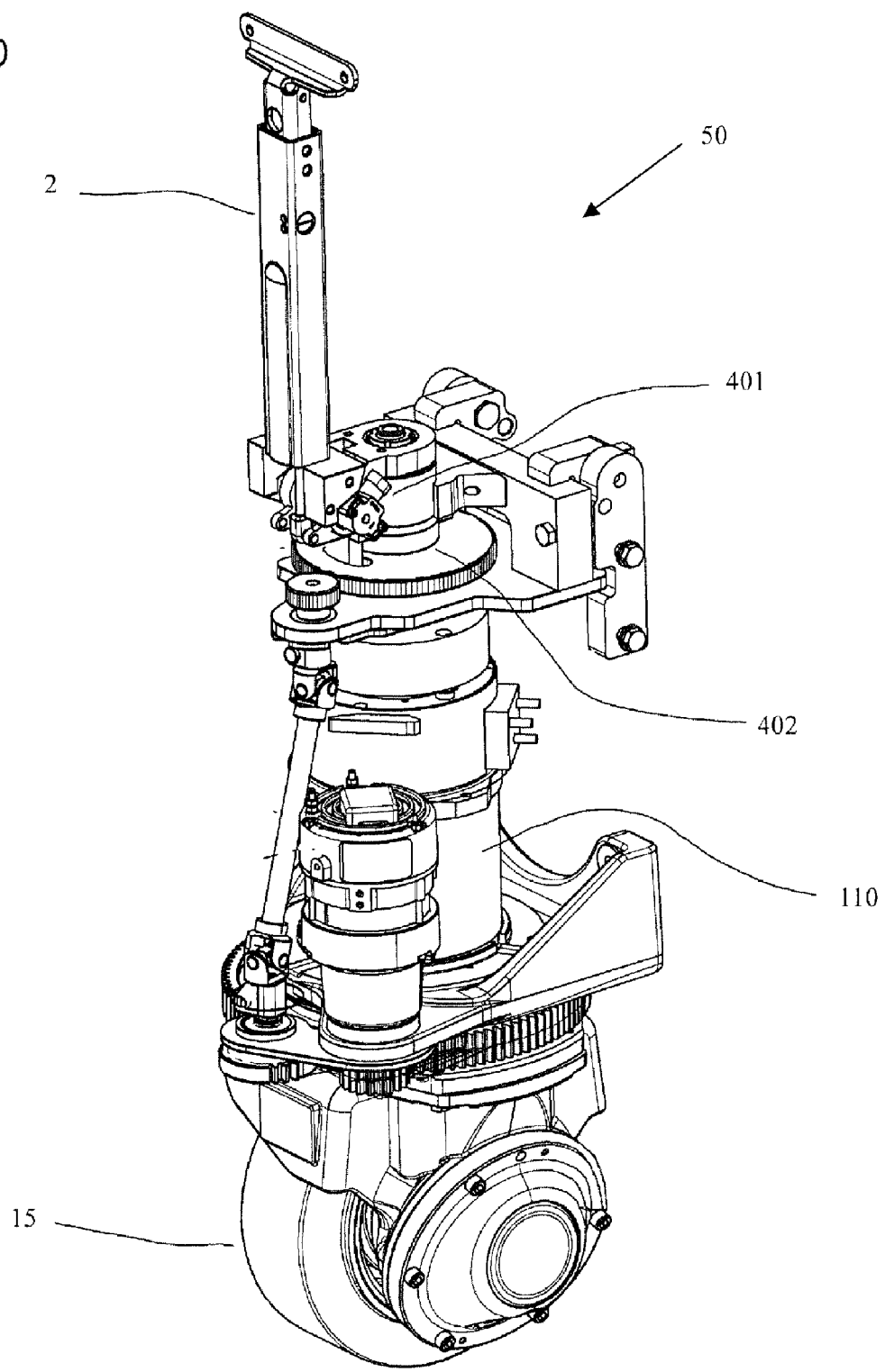
FIG. 10 is a perspective view of a steering control unit.

FIG. 10 shows a steer control unit 50, including a mechanical linkage and relative position of the control arm 2, control arm angle sensor 401, steering angle sensor 402, and the drive wheel 15. One embodiment provides for a control arm angle sensor 401 and a steering angle sensor 402, which determine the angle of control arm 2 both in the vertical (up and down) and horizontal (left and right) directions, respectively. An on-board processor 505 (FIG. 13) can be used to analyze the overall angle of the control arm 2 and determine the maximum allowable acceleration and travel speed, and then relay the information to the motor controller 105 to establish the acceptable acceleration, deceleration, braking and travel speed. The control arm angle data may be constantly monitored by the control arm angle sensor 401 and steering angle sensor 402 and the on-board processor 505, so that the acceleration and travel speed of the pallet truck 20 may be automatically adjusted as the operator moves the control arm 2 during operation of the pallet truck 20.

In one embodiment, a minimum allowable acceleration and travel speed occurs with the control arm 2 located in the extreme left or extreme right steering position while at the same time being positioned in the near vertical or near horizontal non-braking position. The maximum allowable acceleration and travel speed may occur with the control arm 2 located approximately about the center position between left and right steering and at an approximate center position between vertical and horizontal position. Variable allowable acceleration and travel speeds occur when the control arm 2 is located in a position outside of the maximum and minimum acceleration positions described directly above. In one embodiment, the acceleration of the pallet truck 20 is set to zero if the control arm 2 is located in either the vertical or horizontal position.

When the control arm angle sensor 401 and steering angle sensor 402 provide the on-board processor 505 with the position of the control arm 2, the on-board processor 505 is able to compute the allowable level of performance of the traction motor 110. This may be accomplished by means of a mathematical calculation or algorithm, or according to predefined values found in mapped data. Moving the control arm 2 in either vertical or horizontal axis independently, or moving the control arm 2 in both axes concurrently, causes the allowable acceleration, deceleration, braking and travel speed of the pallet truck 20 to vary according to the commands of the on-board processor 505.

Figure 12:
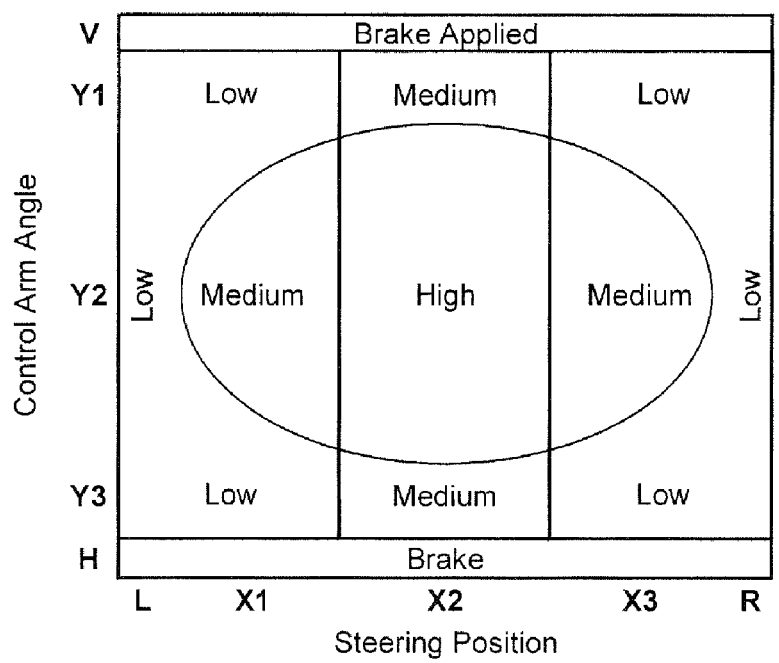
FIG. 12 represents a graphical depiction for determining traction motor performance as a function of the position of the control arm.

FIG. 12 represents a graphical depiction for determining traction motor performance as a function of the position of the control arm 2 about each axis. Example ranges of horizontal movement of the control arm 2 are illustrated as L, X1, X2 and R in FIG. 11. Example ranges of vertical movement of the control arm 2 are illustrated as V, Y1, Y2, Y3 and H in FIG. 6. The horizontal movement of the control arm 2 is represented by the horizontal x-axis of the chart labeled "Steering Position", and the vertical movement of the control arm 2 is represented by the vertical y-axis of the chart labeled "Control Arm Angle".

Although the example vertical and horizontal values illustrated and described with respect to FIGS. 6, 11 and 12 are shown as distinct ranges, it should be understood that the ranges may vary in position and magnitude. In one embodiment, the acceleration, deceleration, braking, and travel speed of the pallet truck 20 varies according to an infinitely variable position of the control arm in the vertical and horizontal axes. In another embodiment, the acceleration, deceleration, braking, and travel speed of the pallet truck 20 varies continuously according to the position of control arm 2 as determined by control arm angle sensor 401 and steering angle sensor 402.

The various combinations of steering position and control arm angle of the control arm 2 are now described in relation to the acceleration, deceleration, braking, and travel speed of the pallet truck 20, with reference to example travel modes as shown in FIG. 6 and FIG. 11. With the control arm 2 located at the approximate center in both the horizontal (x axis) and vertical (y axis) positions, a maximum allowable acceleration and travel speed of the pallet truck 20 is permitted within the current travel mode, low or high. As the control arm 2 is turned to the left or right, it passes into steering positions X1 and X3 (FIG. 11). Within these steering positions, and provided the control arm 2 still lies in the control arm angle shown as Y2 (FIG. 6), a "medium" or intermediate acceleration and travel speed is permitted. If the pallet truck 20 is in the high speed travel mode at the time the angle of the control arm 2 enters steering positions X1 or X3, the on-board processor 505 would disengage the high speed travel mode and cause the pallet truck 20 to enter the low speed travel mode.

As the control arm 2 approaches the approximate maximum left position L or approximate maximum right position R, the "low" or minimum acceleration and travel speed is permitted. The pallet truck 20 would be restricted to this low acceleration and travel speed anytime the control arm 2 is located approximately at the L or R position, and regardless of the position of the control arm 2 in the vertical direction. The on-board processor 505 engages the low speed travel mode any time that the control arm 2 is located approximately at the L or R positions. Low, medium and high traction system performance can be set differently depending on the application, and in a typical pallet truck application could be set as 25%, 60% and 100% of available traction system performance, respectively.

With the control arm 2 in the Y1 or Y3 control arm angle (FIG. 6), the pallet truck 20 would be restricted to a low acceleration and travel speed when the control arm 2 is in the X1 or X3 (FIG. 11) steering positions, and would be restricted to an intermediate acceleration and travel speed when the control arm 2 is in the X2 steering position. Regardless of the steering position of the control arm 2, the on-board processor 505 would cause the pallet truck 20 to brake anytime the control arm angle of the control arm 2 was at the approximate positions of V or H. It should be understood that the system thus described is compatible with a "creep speed" function whereby the operator is able to over-ride the braking condition of the pallet truck 20 with the control arm 2 in a vertical position, and instead cause the pallet truck 2 to move in a low, or creep, speed.

In one embodiment, acceleration and travel speeds of the pallet truck 20 may be greater when the control arm 2 is in range Y2 or X2, and may be at the maximum rate when the position of the control arm 2 lies within ranges Y2 and X2 simultaneously. In another embodiment the maximum acceleration and travel speed is restricted to a lower value when steer arm 2 is in vertical range Y1 or Y2.

The steer control handle 13 includes throttle 107 and pick button 108, as shown in FIG. 2. Operation of the throttle 107 has been described above. Whereas the throttle 107 provides for variable acceleration and travel speeds within the predefined maximum allowable range, according to the position of the control arm 2 and according to the degree the throttle 107 is rotated, the pick button 108 acts to accelerate the traction motor 110 in a binary condition, either on or off. Operation of the pick button 108 may provide for a maximum acceleration and travel speed of the pallet truck 20 as determined by the angle of the control arm 2 in the vertical and horizontal position. Therefore, pressing the pick button 108 causes the pallet truck to accelerate at the maximum value according to the position of control arm 2 and the acceleration command provided by the on-board processor 505.

Acceleration, deceleration, braking and travel speeds may be set differently by the on-board processor 505 when the operator presses the high speed button 4, and causes the pallet truck 20 to enter a high speed travel mode. In another embodiment, the high speed button 4 may only be activated if the control arm 2 lies in a position within both ranges Y2 and X2, as shown in FIG. 6. If the control arm 2 lies outside of this area, than the high speed button 4 may not be activated. In yet another embodiment, a reduced intermediate acceleration and travel speed within the high speed travel range may be possible if the control arm 2 lies with range X2 and either of the ranges Y1 or Y3. This intermediate acceleration and travel speed within the high speed travel range would be higher or lower than the maximum allowable acceleration and travel speed within the low speed travel range, for example. With the control arm 2 located in ranges X1 or X3, it may be desirable that acceleration and travel speeds does not exceed those defined for the low speed travel mode, and the high speed mode would be deactivated.

Figure 13:
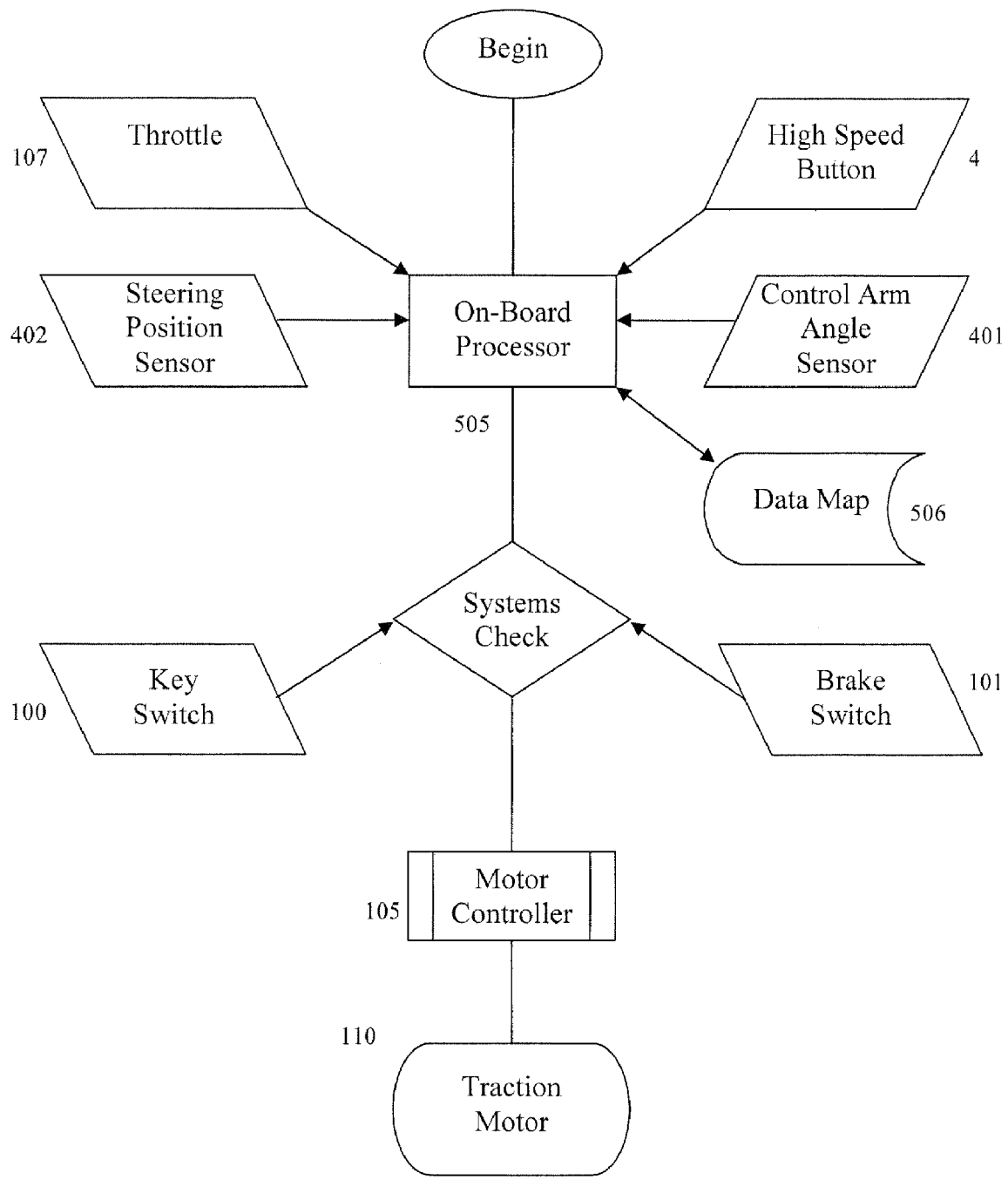
FIG. 13 is a state diagram of the on-board processor and method of determining vehicle acceleration, deceleration, braking and travel speed.

FIG. 13 shows a state diagram providing an overview of the traction and steer system functionality. The on-board processor 505 continuously monitors input from the throttle 107, high speed button 4, steering position sensor 402, and control arm angle sensor 401. Where a pick button 108 (FIG. 2) is included on the pallet truck, this is also monitored by the on-board processor 505, consistent with the input from the throttle 107. The input to the on-board processor 505 constitutes the operator command and serves as a request for performance from the traction system, steering system, and/or braking system. High speed button 4 provides a request for increased performance of the traction motor 110, depending on the position of the throttle 107. The control arm angle sensor 401 provides the vertical position of the control arm 2. The steering position sensor 402 provides the horizontal position of the control arm 2. One or more of the sensors 401, 402 may be used to provide the position and rate of change of position of the control arm about a horizontal and vertical axis.

In one embodiment, the on-board processor 505 evaluates the operator command and references a programmable data map 506 to determine any predetermined performance values for the traction motor 110. The on-board processor 505 continuously monitors the key switch 100 and brake switch 101 independently from the operator command to determine if the operator command should be overridden or modified according to the state of the pallet truck 20. Assuming the key switch 100 and brake switch 101 indicate full operation of the pallet truck 20, the on-board processor 505 sends a command to a motor controller 105 according to the predetermined performance values. The motor controller 105 then actuates the traction motor 110 depending on the operator command. When the key switch 100 or brake switch 101 indicate that a key switch 100 off or braking condition exists, the on-board processor 505 overrides the request for actuation of the traction motor 110 by the operator through the throttle 107.

The system and apparatus described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus for controlling a motorized lift truck, comprising:
a coast control;
a steer arm pivotally attached to the motorized lift truck; and
an actuation cylinder attached to the steer arm, wherein the actuation cylinder maintains the steer arm in an operator selectable position when the coast control is activated, wherein the actuation cylinder impedes movement of the steer arm in a first direction of rotation without impeding movement of the steer arm in a second direction of rotation, and wherein the second direction of rotation is opposite the first direction of rotation.

2. The apparatus according to claim 1 wherein the coast control is located on a floor of the motorized lift truck.

3. The apparatus according to claim 1 wherein the actuation cylinder is attached externally to the steer arm and to a vehicle frame of the motorized lift truck.

4. The apparatus according to claim 3 wherein one end of the actuation cylinder includes a rod attached adjacent to a handle on the steer arm.

5. The apparatus according to claim 1 wherein a hydraulic pressure accumulates in the actuation cylinder when the coast control is activated.

6. The apparatus according to claim 5 wherein at least a portion of the hydraulic pressure is released from the actuation cylinder when the steer arm is moved out of the operator selectable position or when the coast control is deactivated.

7. The apparatus according to claim 6 including a return spring that urges the steer arm in the first direction of rotation when the hydraulic pressure is released.

8. The apparatus according to claim 1 wherein the operator selectable position is one of a plurality of operator selectable positions in which the actuation cylinder maintains the steer arm.

9. The apparatus according to claim 1 including a deadman mechanism, wherein the deadman mechanism is configured to provide a return force on the steer arm in the first direction of rotation, and wherein the actuation cylinder force exerts a force on the steer arm that acts in a direction opposite to that of the return force.

10. A system for controlling operation of a pallet truck, comprising: a steer arm pivotally attached to the pallet truck, wherein the steer arm is connected to a return spring; a hydraulic reservoir;
a hydraulic valve; and
a hydraulic cylinder, wherein the hydraulic valve directs a hydraulic pressure between the hydraulic reservoir and the hydraulic cylinder in order to control a position of the steer arm, wherein the steer arm is maintained in a user selected position when the hydraulic pressure is directed to the hydraulic cylinder, and wherein the hydraulic cylinder overcomes a spring force of the return spring to hold the steer arm in the user selected position.

11. The system according to claim 10 wherein the return spring urges the steer arm to a braking position when the hydraulic pressure is directed to the hydraulic reservoir.

12. The system according to claim 10 including a coast control system that instructs the hydraulic valve to direct the hydraulic pressure to the hydraulic cylinder when the coast control system is activated.

13. The system according to claim 12 wherein at least a portion of the hydraulic pressure is directed to the hydraulic reservoir when the coast control system is deactivated or when the steer arm is moved out of the user selected position.

14. The system according to claim 10 including a check valve, wherein the check valve allows a release of hydraulic fluid from the hydraulic cylinder when the steer arm is rotated towards an approximately horizontal position.

15. The system according to claim 14 wherein the release of hydraulic fluid from the hydraulic cylinder does not impede the rotation of the steer arm.

16. A method, comprising:
  receiving a coast control request;
  confirming a position of a lift truck tiller arm as being in one of a number of non-braking positions, wherein the tiller arm is configured to steer the lift truck;
  activating a coast control system in response to the coast control request when the tiller arm is in a non-braking position, wherein the coast control system comprises a hydraulic cylinder; and
  increasing a hydraulic pressure in the hydraulic cylinder to maintain the tiller arm in the non-braking position.

17. The method according to claim 16 including activating a hydraulic valve to control the hydraulic pressure in the hydraulic cylinder.

18. The method according to claim 16 including decreasing an amount of hydraulic fluid in the hydraulic cylinder when the tiller arm is moved out of the non-braking position.

19. The method according to claim 18 wherein the amount of hydraulic fluid is allowed to decrease without impeding the movement of the tiller arm out of the non-braking position.

20. The method according to claim 19 wherein the amount of hydraulic fluid is decreased when the tiller arm is moved out of the non-braking position towards a horizontal braking position.

21. The method according to claim 16 including:
  receiving a request to deactivate the coast control system; and
  decreasing the hydraulic pressure in the hydraulic cylinder in response to the deactivation of the coast control system.

22. The method according to claim 21 wherein the tiller arm is allowed to move to an approximately vertical position as a result of the decreased hydraulic pressure.

23. The method according to claim 22 wherein the tiller arm is urged to the approximately vertical position by a return force of a deadman mechanism operatively connected to the tiller arm.

24. A lift truck, comprising:
  a coast control actuator;
  a steering control arm pivotally attached to the lift truck;
  a dead-man mechanism configured to urge the steering control arm towards an approximately vertical position; and
  a coast control device configured to maintain the steering control arm in a plurality of non-braking positions, wherein the coast control device impedes movement of the steering control arm towards the approximately vertical position when the coast control actuator is actuated without impeding movement of the steering arm towards an approximately horizontal position.

25. The lift truck according to claim 24 wherein the coast control actuator is located on the steering control arm other than on a steering control handle.

26. The lift truck according to claim 24 wherein the coast control actuator is located on a floor of the lift truck.

27. The lift truck according to claim 24 wherein the plurality of non-braking positions are located between the approximately vertical position and the approximately horizontal position.

28. The lift truck according to claim 24 wherein the coast control device comprises a hydraulic cylinder containing hydraulic fluid when the coast control actuator is actuated, and wherein the hydraulic cylinder releases at least a portion of the hydraulic fluid when the steering arm is moved towards the approximately horizontal position.

* * * * *

UNITED STATES PATENT AND TRADEMARK OFFICE
CERTIFICATE OF CORRECTION

PATENT NO.        : 7,665,555 B2                                           Page 1 of 1
APPLICATION NO. : 11/556046
DATED             : February 23, 2010
INVENTOR(S)       : Rose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,665,555 B2 | Page 1 of 1 |
| APPLICATION NO. | : 11/556046 | |
| DATED | : February 23, 2010 | |
| INVENTOR(S) | : Rose et al. | |

It is certified that error appears in the above-identified patent and that said Letters Patent is hereby corrected as shown below:

At column 14, line 36, please replace "A system for controlling operation of a pallet truck, comprising: a steer arm pivotally attached to the pallet truck, wherein the steer arm is connected to a return spring; a hydraulic reservoir;" with --A system for controlling operations of a pallet truck, comprising:¶a steer arm pivotally attached to the pallet truck, wherein the steer arm is connected to a return spring;¶a hydraulic reservoir;--.

Signed and Sealed this
Twenty-ninth Day of March, 2011

David J. Kappos
*Director of the United States Patent and Trademark Office*